(12) United States Patent
Chen et al.

(10) Patent No.: US 11,053,352 B2
(45) Date of Patent: Jul. 6, 2021

(54) VINYL THERMOSETTING RESIN COMPOSITION, PREPREG, LAMINATE, AND PRINTED CIRCUIT BOARD

(71) Applicant: Shengyi Technology Co., Ltd., Guangdong (CN)

(72) Inventors: Guangbin Chen, Guangdong (CN); Qianfa Liu, Guangdong (CN); Shanyin Yan, Guangdong (CN); Xianping Zeng, Guangdong (CN); Cuiming Du, Guangdong (CN)

(73) Assignee: SHENGYI TECHNOLOGY CO., LTD., Guangdong (CN)

(*) Notice: Subject to any disclaimer, the term of this patent is extended or adjusted under 35 U.S.C. 154(b) by 188 days.

(21) Appl. No.: 16/523,735

(22) Filed: Jul. 26, 2019

(65) Prior Publication Data

US 2020/0247947 A1   Aug. 6, 2020

(30) Foreign Application Priority Data

Feb. 2, 2019   (CN) .......................... 201910108789.5

(51) Int. Cl.

| C08K 9/04 | (2006.01) |
|---|---|
| C08G 65/329 | (2006.01) |
| C08F 236/06 | (2006.01) |
| C08J 5/24 | (2006.01) |
| C08K 3/38 | (2006.01) |
| C08K 5/14 | (2006.01) |
| C08K 7/26 | (2006.01) |
| C08L 53/02 | (2006.01) |
| C08F 8/02 | (2006.01) |
| C08F 8/46 | (2006.01) |

(52) U.S. Cl.
CPC .......... *C08G 65/329* (2013.01); *C08F 236/06* (2013.01); *C08J 5/24* (2013.01); *C08K 3/38* (2013.01); *C08K 5/14* (2013.01); *C08K 7/26* (2013.01); *C08K 9/04* (2013.01); *C08L 53/025* (2013.01); *C08F 8/02* (2013.01); *C08F 8/46* (2013.01); *C08L 2203/20* (2013.01)

(58) Field of Classification Search
CPC ........ C08G 65/329; C08F 236/06; C08J 5/24; C08K 3/38; C08K 5/14; C08K 7/26; C08K 9/04; C08L 53/025
See application file for complete search history.

(56) References Cited

U.S. PATENT DOCUMENTS

2015/0030824 A1*  1/2015  Crosley .................. C03C 14/00
                                                    428/206

FOREIGN PATENT DOCUMENTS

| CN | 101481490 A | 7/2009 |
|---|---|---|
| CN | 103087243 A | 5/2013 |
| CN | 105453705 A | 3/2016 |
| CN | 107474198 A | 12/2017 |
| CN | 109233244 A | 1/2019 |
| JP | 2003515642 A | 5/2003 |
| JP | 2004511580 A | 4/2004 |
| JP | 2005522553 A | 7/2005 |
| JP | 2008115280 A | 5/2008 |
| JP | 2018504511 A | 2/2018 |
| JP | 2018523725 A | 8/2018 |
| KR | 20160034972 A | 3/2016 |
| KR | 20180007306 A | 1/2018 |
| WO | WO 2007/025769 A1 | 3/2007 |

OTHER PUBLICATIONS

Office Action dated Aug. 31, 2020 in Chinese Patent Application No. 201910108789.5.
Office Action dated Sep. 1, 2020 in Japanese Patent Application No. 2019-137057.
Office Action dated Jun. 25, 2020 received in Korean Patent Application No. 10-2019-009961 6 in 9 pages.

* cited by examiner

*Primary Examiner* — Edward J Cain
(74) *Attorney, Agent, or Firm* — Knobbe, Martens, Olson & Bear LLP

(57) ABSTRACT

A vinyl thermosetting resin composition, a prepreg, a laminate, and a printed circuit board are provided. The vinyl thermosetting resin composition has a vinyl thermosetting resin, a curing agent, and hollow borosilicate microspheres with surfaces chemically modified by a vinyl polyphenylene ether resin. The laminate not only has excellent overall properties such as low dielectric constant, low dielectric loss, low water absorption rate, good heat resistance, and the like, but also has only small fluctuations in dielectric constants between batches, which can satisfy the requirements for dielectric constant stability and/or thickness consistency of a substrate.

17 Claims, No Drawings

VINYL THERMOSETTING RESIN COMPOSITION, PREPREG, LAMINATE, AND PRINTED CIRCUIT BOARD

PRIORITY AND CROSS REFERENCE TO RELATED APPLICATIONS

This application claims the benefit of priority to Chinese Application No. 201910108789.5, filed on Feb. 2, 2019, which is hereby incorporated by reference in its entirety.

TECHNICAL FIELD

This disclosure relates to the technical field of laminates, and particularly to a vinyl thermosetting resin composition, a prepreg, a laminate, and a printed circuit board, which are used for a high-frequency electronic circuit.

BACKGROUND ART

With the development of fifth-generation (5G) communication technology, there are higher requirements for overall properties of electronic circuit substrates (laminates, sometimes also referred to as metal-clad plates such as copper-clad plates) used for high frequency. With respect to critical properties such as dielectric constant and dielectric loss of substrates, requirements for various specifications are proposed. Design and development of high-frequency electronic circuit substrates having low dielectric constant and low dielectric loss will be an important field of research and development with respect to manufacturers for manufacturing metal-clad plates such as copper-clad plates at present and in the future.

Design and development of high-frequency electronic circuit substrates having low dielectric constant and low dielectric loss using a low-polarity thermosetting resin are an important technical scheme of research and development with respect to various manufacturers for manufacturing copper-clad plates at present.

The vinyl thermosetting resin has excellent properties of low dielectric constant and low dielectric loss, and has been widely used in high-frequency electronic circuit substrates.

In order to obtain a high-frequency electronic circuit substrate having lower dielectric constant, the addition of hollow glass microspheres is very effective means for technical achievement.

Chinese Patent CN105453705A discloses a dielectric substrate layer, comprising about 30 to about 90 volume percent of a polymer matrix material; and about 5 to about 70 volume percent of hollow borosilicate microspheres, wherein the hollow borosilicate microspheres are product of a process of subjecting the borosilicate microspheres to a treatment with an alkaline liquor; and wherein the dielectric substrate layer has a dielectric constant of less than about 3.5 and a dissipation factor of less than about 0.006 at 10 GHz.

However, the following problems exist for the above patent.

1. The hollow borosilicate microspheres used are hollow microspheres whose surfaces are not treated. These hollow microspheres have a low density and have a problem of significant trend of being float in a gum solution for producing a substrate, leading to a problem of unevenness present in the gum solution. There is a problem of fluctuations in dielectric constants between batches present in the substrates produced, and the requirements for the stability of dielectric constants between batches of the substrates cannot be satisfied. Furthermore, there is a problem of fluctuations in substrate densities between batches present in the substrates produced, so that there are fluctuations in the thickness consistencies of the substrates, leading to fluctuations in stabilities of the characteristic impedance of the printed circuit boards produced. The requirements for the thickness consistencies between batches of the substrates cannot be satisfied.

2. The hollow borosilicate microspheres used are product subjected to treatment with an alkaline liquor. The treatment of the hollow borosilicate microspheres with an alkaline liquor is for the purpose of the reduction of the content of sodium ions in the hollow borosilicate microspheres and the reduction of the dielectric loss of the substrate produced. A step of treating with an alkaline liquor is required in the production of the hollow borosilicate microspheres, and there is a problem that the alkaline liquor used is required to be further treated. Furthermore, the dielectric constant and the dielectric loss of the dielectric substrate layer described above may also be achieved by using another hollow borosilicate microsphere which are not treated with an alkaline liquor.

3. The hollow borosilicate microspheres used are hollow microspheres whose surfaces have been not treated. The substrate produced has problems of high water absorption rate and increased dielectric loss of the substrate.

SUMMARY

Therefore, it is desirable to provide a vinyl thermosetting resin composition, a prepreg, a laminate, and a printed circuit board, which are used for a high-frequency electronic circuit. The laminate produced from the vinyl thermosetting resin composition not only has excellent overall properties such as low dielectric constant, low dielectric loss, low water absorption rate, good heat resistance, and the like, but also has small fluctuations in dielectric constants between batches, which can satisfy the requirements for dielectric constant stability and/or thickness consistency of the laminate by customers.

Through intensive and detailed studies, the inventors of this invention have found that by adding hollow borosilicate microspheres with surfaces chemically modified by a vinyl polyphenylene ether resin to a vinyl thermosetting resin composition, it is possible to increase the interaction between molecular chain segments of the vinyl thermosetting resin, reduce the trend of float of hollow microspheres in a gum solution, and improve the uniformity of a gum; and the water absorption rate of the laminate produced may be reduced by the hollow borosilicate microspheres chemically modified by a vinyl polyphenylene ether resin. Therefore, the invention has been achieved.

In one aspect, this disclosure provides a vinyl thermosetting resin composition, comprising the following components:

(1) a vinyl thermosetting resin;
(2) a curing agent; and
(3) hollow borosilicate microspheres with surfaces chemically modified by a vinyl polyphenylene ether resin.

According to one preferred embodiment of this disclosure, the hollow borosilicate microspheres with surfaces chemically modified by a vinyl polyphenylene ether resin are not treated with an alkaline liquor.

According to another preferred embodiment of this disclosure, the hollow borosilicate microspheres with surfaces chemically modified by a vinyl polyphenylene ether resin are obtained by chemical modification of chemically untreated hollow borosilicate microspheres with a vinyl silane coupling agent and a thermosetting polyphenylene ether resin having an unsaturated double bond, wherein a content of the chemically untreated hollow borosilicate microspheres is 94% to 96% by weight with respect to the hollow borosilicate microspheres with surfaces chemically modified by a vinyl polyphenylene ether resin.

According to another preferred embodiment of this disclosure, the hollow borosilicate microspheres with surfaces chemically modified by a vinyl polyphenylene ether resin has an average particle diameter of no greater than 50 μm.

According to another preferred embodiment of this disclosure, the hollow borosilicate microspheres with surfaces chemically modified by a vinyl polyphenylene ether resin is 10 to 60 parts by weight with respect to 100 parts by weight of the vinyl thermosetting resin.

According to another preferred embodiment of this disclosure, the hollow borosilicate microspheres with surfaces chemically modified by a vinyl polyphenylene ether resin is 20 to 50 parts by weight with respect to 100 parts by weight of the vinyl thermosetting resin.

According to another preferred embodiment of this disclosure, the curing agent is 1 to 3 parts by weight with respect to 100 parts by weight of the vinyl thermosetting resin.

According to another preferred embodiment of this disclosure, the vinyl thermosetting resin is selected from one of a polyphenylene ether resin having an unsaturated double bond, a polybutadiene resin, a polybutadiene copolymer resin, and an elastomer block copolymer, or a mixture of at least two thereof.

According to another preferred embodiment of this disclosure, the polyphenylene ether resin having an unsaturated double bond is selected from one of a polyphenylene ether resin in which two terminal modifying groups are acryl groups, a polyphenylene ether resin in which two terminal modifying groups are styryl groups, and a polyphenylene ether resin in which two terminal modifying groups are vinyl groups, or a mixture of at least two thereof.

According to another preferred embodiment of this disclosure, the polybutadiene resin is selected from one of a 1,2-polybutadiene resin, a maleic anhydride modified polybutadiene resin, an acrylate modified polybutadiene resin, an epoxy modified polybutadiene resin, an amino modified polybutadiene resin, a terminal carboxyl modified polybutadiene resin, and a terminal hydroxy modified polybutadiene resin, or a mixture of at least two thereof.

According to another preferred embodiment of this disclosure, the polybutadiene copolymer resin is selected from one of a polybutadiene-styrene copolymer resin, a polybutadiene-styrene-divinylbenzene graft copolymer resin, a maleic anhydride modified styrene-butadiene copolymer resin, and an acrylate modified styrene-butadiene copolymer resin, or a mixture of at least two thereof.

According to another preferred embodiment of this disclosure, the elastomer block copolymer is selected from one of a styrene-butadiene diblock copolymer, a styrene-butadiene-styrene triblock copolymer, a styrene-(ethylene-butene)-styrene triblock copolymer, a styrene-isoprene diblock copolymer, a styrene-isoprene-styrene triblock copolymer, a styrene-(ethylene-propylene)-styrene triblock copolymer, and a styrene-(ethylene-butene) diblock copolymer, or a mixture of at least two thereof.

According to another preferred embodiment of this disclosure, the curing agent is selected from one of an organic peroxide radical curing agent and a carbon-based radical curing agent, or a mixture of at least two thereof.

According to another preferred embodiment of this disclosure, the organic peroxide radical curing agent is selected from one of dicumyl peroxide, 1,3-bis(tert-butylperoxyisopropyl)benzene, 2,5-di-tert-butylperoxy-2,5-dimethylhexane, 2,5-di-tert-butylperoxy-2,5-dimethyl-3-hexyne, di-t-butyl peroxide, and tert-butylcumyl peroxide, or a mixture of at least two thereof.

In another aspect, this disclosure provides a prepreg, comprising a reinforcing material and the thermosetting resin composition according to any one described above attached thereon after impregnation and drying.

In still another aspect, this disclosure provides a metal foil-clad laminate, comprising: a sheet of the prepreg as described above and a metal foil clad on one side or both sides of the prepreg; or at least two sheets of laminated prepregs and a metal foil clad on one side or both sides of the laminated prepregs, wherein at least one sheet of the at least two sheets of the laminated prepregs is the prepreg as described above.

In yet another aspect, this disclosure provides a printed circuit board, comprising at least one sheet of the prepreg as described above.

According to this disclosure, there may be provided a vinyl thermosetting resin composition, a prepreg, a laminate, and a printed circuit board; wherein since the surfaces of the hollow borosilicate microspheres have a molecular chain segment structure of polyphenylene ether in the vinyl thermosetting resin composition, it is possible, in the gum solution for producing the laminate, to increase the interaction between molecular chain segments of the unsaturated thermosetting resin, reduce the trend of float of hollow microspheres in a gum solution, and improve the uniformity of a gum; and the water absorption rate of the laminate produced may be reduced by the hollow borosilicate microspheres chemically modified by a vinyl polyphenylene ether resin. Therefore, the laminate produced not only has excellent overall properties such as low dielectric constant, low dielectric loss, low water absorption rate, good heat resistance, and the like, but also has small fluctuations in dielectric constants between batches, which can satisfy the requirements for dielectric constant stability and/or thickness consistency of the laminate by customers.

DETAILED DESCRIPTION

The technical solutions in the Examples of this disclosure will be described clearly and fully below in conjunction with specific embodiments of this disclosure. Obviously, the embodiments and/or Examples described are merely a part of the embodiments and/or Examples of this disclosure, rather than all of the embodiments and/or Examples. Based on the embodiments and/or Examples of this disclosure, all other embodiments and/or all other Examples obtained by those skilled in the art without performing inventive work belong to the scope protected by this disclosure.

In this disclosure, all characteristics of numeric values mean to be within an error range of measurement, for example within ±10%, within ±5%, or within ±1% of a defined numeric value.

Said "comprise", "include", or "contain" in this disclosure mean that there may be other components besides the components. These other components confer various characteristics to the prepreg. Additionally, said "comprise", "include", or "contain" in this disclosure may further comprise "substantially consist of", and can be replaced by "is" or "consist of".

In this disclosure, the amount, the ratio, and the like are based on weight, unless specifically indicated.

As described above, this disclosure may provide a vinyl thermosetting resin composition, comprising the following components:
(1) a vinyl thermosetting resin;
(2) a curing agent; and
(3) hollow borosilicate microspheres with surfaces chemically modified by a vinyl polyphenylene ether resin.

Hollow Borosilicate Microspheres With Surfaces Chemically Modified by Vinyl Polyphenylene Ether Resin In the vinyl thermosetting resin composition, the hollow borosilicate microspheres with surfaces chemically modified by a vinyl polyphenylene ether resin may be not treated with an alkaline liquor.

The hollow borosilicate microspheres with surfaces chemically modified by a vinyl polyphenylene ether resin are obtained by chemical modification of chemically untreated hollow borosilicate microspheres with a vinyl silane coupling agent and a thermosetting polyphenylene ether resin having an unsaturated double bond, wherein a content of the chemically untreated hollow borosilicate microspheres is 94% to 96% by weight with respect to the hollow borosilicate microspheres with surfaces chemically modified by a vinyl polyphenylene ether resin. Particularly, the hollow borosilicate microspheres with surfaces chemically modified by a vinyl polyphenylene ether resin may be chemically modified as follows:

1. Subjecting hollow borosilicate microspheres with unmodified surfaces are subjected to surface treatment by using a vinyl silane coupling agent, so that the surface of the hollow borosilicate microspheres are chemically modified with a reactive group having a vinyl group to obtain hollow borosilicate microspheres with surfaces chemically modified by a vinyl group; and 2. Subjecting the hollow borosilicate microspheres with surfaces modified by a vinyl silane coupling agent to copolymerization reaction with a thermosetting polyphenylene ether resin having an unsaturated double bond, so that the surfaces of the hollow borosilicate microspheres are chemically modified to have a molecular chain segment structure of polyphenylene ether to obtain hollow borosilicate microspheres with surfaces chemically modified by a vinyl polyphenylene ether resin.

The thermosetting polyphenylene ether resin having an unsaturated double bond, which chemically modifies the hollow borosilicate microspheres, is selected from one of a polyphenylene ether resin in which two terminal modifying groups are acryl groups, a polyphenylene ether resin in which two terminal modifying groups are styryl groups, and a polyphenylene ether resin in which two terminal modifying groups are vinyl groups, or a mixture of at least two thereof.

An exemplary vinyl silane coupling agent may be KBM-403 from Shin-Etsu.

An exemplary thermosetting polyphenylene ether resin having an unsaturated double bond may be SA9000 from Sabic.

An exemplary hollow borosilicate microsphere with unmodified surfaces may be iM16K from 3M.

An exemplary hollow borosilicate microsphere with unmodified surfaces may be S38HS from 3M.

Chemical treatment may include, for example, treatment with an alkaline liquor and surface chemical modification treatment.

The hollow borosilicate microspheres with surfaces chemically modified by a vinyl polyphenylene ether resin may have an average particle diameter of no greater than 50 µm.

The hollow borosilicate microspheres with surfaces chemically modified by a vinyl polyphenylene ether resin are used as a filler in the vinyl thermosetting resin composition. The prepreg may be produced from the vinyl thermosetting resin composition.

The hollow borosilicate microspheres with surfaces chemically modified by a vinyl polyphenylene ether resin have an average particle diameter of no greater than about 50 µm.

If the hollow borosilicate microspheres with surfaces chemically modified by a vinyl polyphenylene ether resin have an average particle diameter of greater than about 50 µm, the particle size of the filler in a thin prepreg will exceed the thickness of the thin prepreg, leading to a problem that the filler is exposed and the reliability of the laminate is impacted.

The hollow borosilicate microspheres with surfaces chemically modified by a vinyl polyphenylene ether resin are 10 to 60 parts by weight, preferably 20 to 50 parts by weight, with respect to 100 parts by weight of the vinyl thermosetting resin.

Furthermore, the hollow borosilicate microspheres used are a material which are not treated with an alkaline liquor, so that the procedure of treatment with an alkaline liquor in the production process of the hollow borosilicate microspheres is omitted, the production efficiency is improved, and the production process is more environmentally friendly.

Vinyl Thermosetting Resin

In the vinyl thermosetting resin composition, the vinyl thermosetting resin may be selected from one of a polyphenylene ether resin having an unsaturated double bond, a polybutadiene resin, a polybutadiene copolymer resin, and an elastomer block copolymer, or a mixture of at least two thereof.

The polyphenylene ether resin having an unsaturated double bond may be selected from one of a polyphenylene ether resin in which two terminal modifying groups are acryl groups, a polyphenylene ether resin in which two terminal modifying groups are styryl groups, and a polyphenylene ether resin in which two terminal modifying groups are vinyl groups, or a mixture of at least two thereof.

An exemplary vinyl thermosetting resin may be SA9000 from Sabic.

An exemplary vinyl thermosetting resin may be St-PPE-1 from Mitsubishi Chemical.

The polybutadiene resin may be selected from one of a 1,2-polybutadiene resin, a maleic anhydride modified polybutadiene resin, an acrylate modified polybutadiene resin, an epoxy modified polybutadiene resin, an amino modified polybutadiene resin, a terminal carboxyl modified polybutadiene resin, and a terminal hydroxy modified polybutadiene resin, or a mixture of at least two thereof.

An exemplary polybutadiene resin may be B1000 from Soda, Japan.

An exemplary polybutadiene resin may be B3000 from Soda, Japan.

The polybutadiene copolymer resin may be selected from one of a polybutadiene-styrene copolymer resin, a polybutadiene-styrene-divinylbenzene graft copolymer resin, a maleic anhydride modified styrene-butadiene copolymer resin, and an acrylate modified styrene-butadiene copolymer resin, or a mixture of at least two thereof.

An exemplary polybutadiene copolymer resin may be RICON 100 from CRAY VALLEY.

An exemplary polybutadiene copolymer resin may be RICON 181 from CRAY VALLEY.

The elastomer block copolymer may be selected from one of a styrene-butadiene diblock copolymer, a styrene-butadiene-styrene triblock copolymer, a styrene-(ethylene-butene)-styrene triblock copolymer, a styrene-isoprene diblock copolymer, a styrene-isoprene-styrene triblock copolymer, a styrene-(ethylene-propylene)-styrene triblock copolymer, and a styrene-(ethylene-butene) diblock copolymer, or a mixture of at least two thereof.

An exemplary elastomer block copolymer may be D1118 from Kraton, United States.

An exemplary elastomer block copolymer may be D1192 from Kraton, United States.

Curing Agent

In the vinyl thermosetting resin composition, the curing agent may be selected from an organic peroxide radical curing agent and a carbon-based radical curing agent.

The organic peroxide radical curing agent may be selected from one of dicumyl peroxide, 1,3-bis(tert-butylperoxyisopropyl)benzene, 2,5-di-tert-butylperoxy-2,5-dimethylhexane, 2,5-di-tert-butylperoxy-2,5-dimethyl-3-hexyne, di-t-butyl peroxide, and tert-butylcumyl peroxide, or a mixture of at least two thereof.

The carbon-based radical curing agent may be selected from 2,3-dimethyl-2,3-diphenylbutane.

The curing agent may be 1 to 3 parts by weight with respect to 100 parts by weight of the vinyl thermosetting resin.

An exemplary organic peroxide radical curing agent may be DCP from Shanghai Gaoqiao.

An exemplary carbon-based radical curing agent may be Perkadox 30 from Akzo Nobel.

The vinyl thermosetting resin composition may further comprise silane coupling agents or/and wetting dispersants. These silane coupling agents are not particularly limited, as long as they are silane coupling agents typically used in surface treatment. As specific examples, aminosilanes such as y-aminopropyltriethoxysilane, N-β-(aminoethyl)-Y-aminopropyltrimethoxysilane, and the like, epoxysilanes such as γ-glycidyloxypropyltrimethoxysilane and the like, vinylsilanes such as γ-methylacryloxypropyltrimethoxysilane and the like, and anionic silanes such as N-β-(N-vinylbenzilaminoethyl)-γ-aminopropyltrimethoxysilane hydrochloride, phenylsilanes, and the like may be exemplified. One or at least two appropriately used in combination thereof may be selected. Furthermore, the wetting dispersants are not particularly limited, as long as they are wetting dispersants used in setting resin compositions. Wetting dispersants such as Disperbyk-110, 111, 180, 161, BYK-W996, W9010, W903, and the like, for example produced by BYK Chemie Japan, may be exemplified.

The vinyl thermosetting resin composition may further contain various additives. As specific examples, a flame retardant, an antioxidant, a heat stabilizer, an antistatic agent, an ultraviolet absorbent, a pigment, a colorant, a lubricant, and the like may be exemplified. These additives may be used alone, or may be used by mixing two or more thereof.

The flame retardant may be selected from one or a mixture of at least two of halogen-based flame retardants and phosphorus-based flame retardants.

The bromine-based flame retardant may be selected from any one or a mixture of at least two of decabromodiphenyl ether, hexabromobenzene, decabromodiphenyl ethane, and ethylene-bis(tetrabromophthalimide).

The phosphorus-based flame retardant may be selected from any one or a mixture of at least two of tris(2,6-dimethylphenyl)phosphine, 10-(2,5 -dihydroxyphenyl)-9, 10-dihydro-9-oxa-10-phospha-phenanthrene-10-oxide, 2,6-bis(2,6-dimethylphenyl)phosphinobenzene, and 10-phenyl-9,10-dihydro-9-oxa-10-phospha-phenanthrene-10-oxide.

The weight of the flame retardant may be 15-25 parts by weight with respect to 100 parts by weight of the vinyl thermosetting resin.

An exemplary bromine-containing flame retardant may be BT-93W from Albemarle, United States.

An exemplary phosphorus-containing flame retardant may be XP-7866 from Albemarle, United States.

The vinyl thermosetting resin composition described above may further comprise a non-hollow inorganic filler.

The non-hollow inorganic filler may be selected from one or more of crystalline silica, fused silica, spherical silica, boron nitride, aluminum hydroxide, titanium dioxide, strontium titanate, barium titanate, aluminum oxide, magnesium oxide, barium sulfate, and talc.

The weight of the non-hollow inorganic filler may be 150-250 parts by weight with respect to 100 parts by weight of the vinyl thermosetting resin.

An exemplary non-hollow inorganic filler may be SC2050-SVJ from Adematacs. An exemplary non-hollow inorganic filler may be DQ2028V from Jiangsu Lianrui.

The gum produced from the vinyl thermosetting resin composition in this disclosure comprises a solvent. This solvent is not particularly limited. As specific examples, alcohols such as methanol, ethanol, butanol, and the like, ethers such as ethyl cellosolve, butyl cellosolve, ethylene glycol-methyl ether, carbitol, butyl carbitol, and the like, ketones such as acetone, butanone, methyl ethyl ketone, methyl isobutyl ketone, cyclohexanone, and the like, aromatic hydrocarbons such as toluene, xylene, mesitylene, and the like, esters such as ethoxyethyl acetate, ethyl acetate, and the like, and nitrogen-containing solvents such as N,N-dimethylformamide, N,N-dimethylacetamide, N-methyl-2-pyrrolidone, and the like may be exemplified. The solvent described above may be used alone, or may be used by mixing two or more thereof. It is preferable that aromatic hydrocarbon solvents such as toluene, xylene, mesitylene, and the like and ketone solvents such as acetone, butanone, methyl ethyl ketone, methyl isobutyl ketone, cyclohexanone, and the like are mixed and used. The usage amount of the solvent may be selected by those skilled in the art according to the experience of their own, as long as the resin gum solution obtained is allowed to reach a viscosity suitable for use.

As for a production method of the vinyl thermosetting resin composition of this disclosure, production may be performed by a well-known method such as compounding, stirring, and mixing various components of the vinyl thermosetting resin composition.

The production of a high-speed electronic circuit substrate (laminate) by using the vinyl thermosetting resin composition described above comprises the steps of:

adding a vinyl thermosetting resin, a curing agent, hollow borosilicate microspheres with surfaces chemically modified by a vinyl polyphenylene ether resin, and optionally other components such as a flame retardant and a non-hollow inorganic filler into an appropriate amount of solvent, uniformly dispersing them with stirring, so that solid components therein are uniformly dispersed in a gum solution; soaking a glass fiber cloth with the gum solution produced, and performing sheet baking in an oven at a suitable temperature for a certain period to remove the solvent and form a semi-cured sheet; neatly overlapping several semi-cured sheets, providing metal foils such as copper foils on the top and the bottom; and performing lamination and curing in a press so as to obtain a high-speed electronic circuit substrate.

This disclosure may also provide a prepreg, comprising a reinforcing material and the vinyl thermosetting resin composition according to any one described above attached thereon after impregnation and drying.

Examples of the reinforcing material may include glass fiber cloths. In the description below, the glass fiber cloth reinforcing material and the glass fiber cloth may be interchangeably used.

Particularly, the vinyl thermosetting resin composition are formulated into a gum solution by dispersion by mechanical stirring, emulsification, or ball milling, and then a glass fiber cloth is soaked with this gum solution to obtain a prepreg by drying. A laminate may be produced by heat-pressing this prepreg and metal foils such as copper foils in a vacuum press.

This disclosure may also provide a laminate and a printed circuit board.

The laminate may contain at least sheet of the prepreg of any one described above. For example, the laminate is a metal foil-clad laminate. The metal foil-clad laminate comprises: a sheet of the prepreg as described above and a metal foil clad on one side or both sides of the prepreg; or at least two sheets of laminated prepregs and a metal foil clad on one side or both sides of the laminated prepregs, wherein at least one sheet of the at least two sheets of the laminated prepregs is the prepreg as described above, or preferably each sheet of the at least two sheets of the laminated prepregs is the prepreg as described above.

The printed circuit board may contain at least sheet of the prepreg of any one described above.

The prepreg is laminated between metal foils such as copper foils, and a laminate (i.e., a copper clad laminate) may be produced after heat pressing.

According to this disclosure, there may be provided a vinyl thermosetting resin composition, a prepreg, a laminate, and a printed circuit board; Since the surface of the hollow borosilicate microspheres has a molecular chain segment structure of polyphenylene ether, it is possible, in the gum solution for producing the laminate, to increase the interaction between molecular chain segments of the unsaturated thermosetting resin, reduce the trend of float of hollow microspheres in a gum solution, and improve the uniformity of a gum; and the water absorption rate of the laminate produced may be reduced by the hollow borosilicate microspheres chemically modified by a vinyl polyphenylene ether resin. Therefore, the laminate produced not only has excellent overall properties such as low dielectric constant, low dielectric loss, low water absorption rate, good heat resistance, and the like, but also has small fluctuations in dielectric constants between batches, which can satisfy the requirements for dielectric constant stability and/or thickness consistency of the laminate by customers.

Technical solutions of this disclosure will be further illustrated by specific Examples below. In the Examples and Comparative Examples below, the percentage, the ratio, and the like are based on weight, unless specifically indicated.

PREPARATION EXAMPLES

Preparation of hollow borosilicate microspheres with surfaces modified by unsaturated polyphenylene ether resin:

Preparation Example 1

Preparation of Hollow Borosilicate Microspheres HQ 100 g of hollow borosilicate microspheres iM16K (from 3M, average particle diameter: 20 μm) with unmodified surfaces were added to a high-speed mixer with the temperature set to be 100° C. and preheated them for 5 min, 5 g of a vinyl silane coupling agent KBM-1003 was added thereto, and they were stirred for 30 min Stirring was stopped, and the temperature was maintained for 20 min, followed by cooling to room temperature, to obtain 103 g of hollow borosilicate microspheres modified by a vinyl silane coupling agent.

In a reactor, 100 g of a thermosetting vinyl polyphenylene ether resin having an unsaturated double bond (SA9000) was added, 300 g of toluene was added, the temperature was increased to 100° C., and the polyphenylene ether resin was completely dissolved by stirring. 100 g of the hollow borosilicate microspheres modified by the vinyl silane coupling agent was added thereto with stirring and refluxing. A radical curing agent DCP was added thereto, and reaction was performed with stirring for 60 min and then stopped, followed by cooling to room temperature. 500 g of a toluene solvent was added thereto, and float solids were collected, which were hollow borosilicate microspheres HQ with surfaces modified by a vinyl polyphenylene ether resin. They were washed with a toluene solvent 2-3 times, followed by drying at 80° C. under a vacuum condition for 2 h to obtain 96 g of hollow borosilicate microspheres HQ with surfaces modified by vinyl polyphenylene ether resin, wherein the content of the chemically untreated hollow borosilicate microspheres iM16K was 94.5% by weight with respect to the hollow borosilicate microspheres HQ with surfaces chemically modified by a vinyl polyphenylene ether resin. This value was obtained by testing the ash content of the hollow borosilicate microspheres HQ with surfaces chemically modified by a vinyl polyphenylene ether resin. The specific testing method was a TGA method, wherein the temperature was increased to 700° C. at 10° C./min to obtain a TGA curve and the residual amount corresponding to 700° C. was this value.

Preparation Example 2

Preparation of Hollow Borosilicate Microspheres HM 100 g of hollow borosilicate microspheres S38HS (from 3M, average particle diameter: 44 μm) with unmodified surfaces were added to a high-speed mixer with the temperature set to be 100° C. and preheated them for 5 min, 5 g of a vinyl silane coupling agent KBM-1003 was added thereto, and they were stirred for 30 min Stirring was stopped, and the temperature was maintained for 20 min, followed by cooling to room temperature, to obtain 103 g of hollow borosilicate microspheres modified by a vinyl silane coupling agent.

In a reactor, 100 g of a thermosetting vinyl polyphenylene ether resin having an unsaturated double bond (SA9000) was added, 300 g of toluene was added, the temperature was increased to 100° C., and the polyphenylene ether resin was completely dissolved by stirring. 100 g of the hollow borosilicate microspheres modified by the vinyl silane coupling agent were added thereto with stirring and refluxing. A radical curing agent DCP was added thereto, and reaction was performed with stirring for 60 min and then stopped, followed by cooling to room temperature. 500 g of a toluene solvent was added, and float solids were collected, which were hollow borosilicate microspheres HQ with surfaces modified by a vinyl polyphenylene ether resin. They ware washed with a toluene solvent 2-3 times, followed by drying at 80° C. under a vacuum condition for 2 h to obtain 98 g of hollow borosilicate microspheres HM with surfaces modified by vinyl polyphenylene ether resin, wherein the content of the chemically untreated hollow borosilicate microspheres S38HS was 95.5% by weight with respect to the hollow borosilicate microspheres HM with surfaces chemically modified by a vinyl polyphenylene ether resin. This value was obtained by testing the ash content of the hollow borosilicate microspheres HM with surfaces chemically modified by a vinyl polyphenylene ether resin. The specific testing method was a TGA method, wherein the temperature was increased to 700° C. at 10° C./min to obtain a TGA curve and the residual amount corresponding to 700° C. was this value.

EXAMPLES

In Examples of the present invention, raw materials selected for producing a high-speed electronic circuit substrate were as shown in the following Table.

TABLE 1

| Manufacturer | Name or model of product | Description of material |
|---|---|---|
| Sabic | SA9000 | Methacrylate modified polyphenylene ether resin |
| Mitsubishi Chemical | St-PPE-1 | Vinylbenzyl ether modified polyphenylene ether resin |
| Soda, Japan | B1000 | Polybutadiene resin |
| Soda, Japan | B3000 | Polybutadiene resin |
| CRAY VALLEY | Ricon100 | Styrene-butadiene copolymer |
| CRAY VALLEY | Ricon181 | Styrene-butadiene copolymer |
| Kraton, United States | D1118 | Styrene-(ethylene-butene)-styrene triblock copolymer |
| Kraton, United States | D1192 | Styrene-(ethylene-butene)-styrene triblock copolymer |
| Shanghai Gaoqiao | DCP | Dicumyl peroxide |
| Akzo Nobel | Perkadox 30 | 2,3-dimethyl-2,3-diphenylbutane |
| Adematacs | SC2050-SVJ | Fused silica micropowder, average particle diameter: 0.5 μm |
| Jiangsu Lianrui | DQ2028L | Fused silica micropowder, average particle diameter: 3 μm |
| Albemarle, United States | BT-93W | Bromine-containing flame retardant |
| Albemarle, United States | XP-7866 | Phosphorus-containing flame retardant |
| 3M | iM16K | Hollow borosilicate microspheres which have not been subjected to surface coating treatment and alkaline liquor treatment, average particle diameter: 20 μm |
| 3M | S38HS | Hollow borosilicate microspheres which have not being subjected to surface coating treatment and alkaline liquor treatment, average particle diameter: 44 μm |
| Shanghai Honghe | 1078 | Glass fiber cloth |
| Preparation Example 1 | HQ | Hollow borosilicate microspheres with surfaces modified by a vinyl polyphenylene ether resin |
| Preparation Example 2 | HM | Hollow borosilicate microspheres with surfaces modified by a vinyl polyphenylene ether resin |

Example 1

50 g of a polybutadiene resin B1000, 50 g of a styrene-(ethylene-butene)-styrene triblock copolymer D1118, 3.0 g of a curing agent DCP, 30 g of a bromine-containing flame retardant BT-93W, 20 g of hollow borosilicate microspheres HQ with surfaces modified by a vinyl polyphenylene ether resin, and 150 g of a fused silica micropowder DQ2028L were dissolved in a toluene solvent, and the viscosity was adjusted 50 seconds, which was tested with a No. 4 viscosity cup, to obtain a gum. A 1078 glass fiber cloth was soaked with the gum and controlled to a weight of 190 g by a clamp shaft, sheet baking was performed in an oven, and the toluene solvent was removed to produce a 1078 bonded sheet (a prepreg). Six 1078 bonded sheets were laminated, and copper foils having a thickness of 1OZ were provided on the top and the bottom surfaces, followed by lamination and curing under vacuum in a press for 90 min in which the curing pressure was 25 Kg/cm$^2$ and the curing temperature was 180° C., to produce a copper clad laminate (a high-speed electronic circuit substrate). 5 batches of high-speed electronic circuit substrates were produced in total. The physical properties of the copper clad laminates (the high-speed electronic circuit substrates) produced were measured. Components and usage amounts of the composition and physical properties of the copper clad laminate were as shown in Table 2.

Examples 2-28 and Comparative Examples 1-14

Copper clad laminates (high-speed electronic circuit substrates) of Examples 2-28 and Comparative Examples 1-14 were produced in the same manner as that of Example 1, except that Components and usage amounts of the composition and physical properties were as shown in Tables 2-7, respectively.

TABLE 2

| Component | Example 1 | Example 2 | Example 3 | Example 4 | Example 5 | Example 6 | Example 7 |
|---|---|---|---|---|---|---|---|
| B1000 | 50 | 80 | 30 | 50 | 50 | 50 | 50 |
| D1118 | 50 | 20 | 70 | 50 | 50 | 50 | 50 |
| Perkadox 30 | 3.0 | 2.0 | 2.0 | 2.0 | 2.0 | 3.0 | 3.0 |
| BT-93W | 20 | 20 | 20 | 15 | 20 | 25 | 0 |
| XP-7866 | 0 | 0 | 0 | 0 | 0 | 0 | 25 |
| HQ | 30 | 30 | 30 | 20 | 40 | 60 | 30 |
| DQ2028L | 150 | 200 | 250 | 200 | 200 | 200 | 200 |
| Property | | | | | | | |
| Dk(10G) | 2.8 | 2.9 | 3.1 | 2.9 | 2.9 | 2.9 | 2.9 |
| Df(10G) | 0.00033 | 0.00034 | 0.00035 | 0.00034 | 0.00034 | 0.00034 | 0.00034 |

TABLE 2-continued

| Component | Example 1 | Example 2 | Example 3 | Example 4 | Example 5 | Example 6 | Example 7 |
|---|---|---|---|---|---|---|---|
| Water absorption rate (%) | 0.10 | 0.11 | 0.13 | 0.11 | 0.12 | 0.14 | 0.12 |
| Dk(10G) 5-batch range of the substrates | 0.040 | 0.040 | 0.040 | 0.042 | 0.043 | 0.041 | 0.041 |
| Thickness (0.76 mm) 5-batch range of the substrates | 0.021 | 0.022 | 0.020 | 0.020 | 0.023 | 0.020 | 0.021 |

TABLE 3

| Component | Example 8 | Example 9 | Example 10 | Example 11 | Example 12 | Example 13 | Example 14 |
|---|---|---|---|---|---|---|---|
| SA9000 | 50 | 80 | 30 | 50 | 50 | 50 | 50 |
| Ricon100 | 50 | 20 | 70 | 50 | 50 | 50 | 50 |
| DCP | 3.0 | 2.0 | 2.0 | 2.0 | 2.0 | 3.0 | 3.0 |
| BT-93W | 20 | 20 | 20 | 15 | 20 | 25 | 0 |
| XP-7866 | 0 | 0 | 0 | 0 | 0 | 0 | 25 |
| HQ | 30 | 30 | 30 | 20 | 40 | 60 | 30 |
| DQ2028L | 150 | 200 | 250 | 200 | 200 | 200 | 200 |
| Property | | | | | | | |
| Dk(10G) | 2.9 | 3.0 | 3.2 | 3.0 | 3.0 | 3.0 | 3.0 |
| Df(10G) | 0.00035 | 0.00036 | 0.00037 | 0.00036 | 0.00036 | 0.00036 | 0.00036 |
| Water absorption rate (%) | 0.11 | 0.12 | 0.13 | 0.11 | 0.12 | 0.13 | 0.13 |
| Dk(10G) 5-batch range of the substrates | 0.040 | 0.042 | 0.040 | 0.039 | 0.045 | 0.050 | 0.042 |
| Thickness (0.76 mm) 5-batch range of the substrates | 0.022 | 0.020 | 0.023 | 0.020 | 0.022 | 0.020 | 0.024 |

TABLE 4

| Component | Example 15 | Example 16 | Example 17 | Example 18 | Example 19 | Example 20 | Example 21 |
|---|---|---|---|---|---|---|---|
| B3000 | 50 | 80 | 30 | 50 | 50 | 50 | 50 |
| D1192 | 50 | 20 | 70 | 50 | 50 | 50 | 50 |
| Perkadox 30 | 3.0 | 2.0 | 2.0 | 2.0 | 2.0 | 3.0 | 3.0 |
| BT-93W | 20 | 20 | 20 | 15 | 20 | 25 | 0 |
| XP-7866 | 0 | 0 | 0 | 0 | 0 | 0 | 25 |
| HM | 30 | 30 | 30 | 20 | 40 | 60 | 30 |
| SC2050-SVJ | 150 | 200 | 250 | 200 | 200 | 200 | 200 |
| Property | | | | | | | |
| Dk(10G) | 2.9 | 3.0 | 3.2 | 3.0 | 3.0 | 3.0 | 3.0 |
| Df(10G) | 0.00035 | 0.00036 | 0.00037 | 0.00036 | 0.00036 | 0.00036 | 0.00036 |
| Water absorption rate (%) | 0.11 | 0.13 | 0.13 | 0.11 | 0.12 | 0.12 | 0.13 |
| Dk(10G) 5-batch range of the substrates | 0.040 | 0.042 | 0.040 | 0.039 | 0.045 | 0.050 | 0.042 |
| Thickness (0.76 mm) 5-batch range of the substrates | 0.022 | 0.020 | 0.023 | 0.020 | 0.022 | 0.020 | 0.024 |

TABLE 5

| Component | Example 22 | Example 23 | Example 24 | Example 25 | Example 26 | Example 27 | Example 28 |
|---|---|---|---|---|---|---|---|
| St-PPE-1 | 50 | 80 | 30 | 50 | 50 | 50 | 50 |
| Ricon181 | 50 | 20 | 70 | 50 | 50 | 50 | 50 |
| DCP | 3.0 | 2.0 | 2.0 | 2.0 | 2.0 | 3.0 | 3.0 |
| BT-93W | 20 | 20 | 20 | 15 | 20 | 25 | 0 |
| XP-7866 | 0 | 0 | 0 | 0 | 0 | 0 | 25 |

TABLE 5-continued

| Component | Example 22 | Example 23 | Example 24 | Example 25 | Example 26 | Example 27 | Example 28 |
|---|---|---|---|---|---|---|---|
| HM | 30 | 30 | 30 | 20 | 40 | 60 | 30 |
| SC2050-SVJ | 150 | 200 | 250 | 200 | 200 | 200 | 200 |
| Property | | | | | | | |
| Dk(10G) | 2.8 | 3.0 | 3.1 | 3.0 | 3.0 | 3.0 | 3.0 |
| Df(10G) | 0.00035 | 0.00036 | 0.00037 | 0.00036 | 0.00036 | 0.00036 | 0.00036 |
| Water absorption rate (%) | 0.11 | 0.12 | 0.13 | 0.10 | 0.12 | 0.13 | 0.12 |
| Dk(10G) 5-batch range of the substrates | 0.040 | 0.041 | 0.040 | 0.039 | 0.046 | 0.050 | 0.042 |
| Thickness (0.76 mm) 5-batch range of the substrates | 0.021 | 0.020 | 0.023 | 0.021 | 0.022 | 0.020 | 0.023 |

TABLE 6

| Component | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| B1000 | 50 | 80 | 30 | 50 | 50 | 50 | 50 |
| D1118 | 50 | 20 | 70 | 50 | 50 | 50 | 50 |
| Perkadox 30 | 3.0 | 2.0 | 2.0 | 2.0 | 2.0 | 3.0 | 3.0 |
| BT-93W | 20 | 20 | 20 | 15 | 20 | 25 | 0 |
| XP-7866 | 0 | 0 | 0 | 0 | 0 | 0 | 25 |
| iM16K | 30 | 30 | 30 | 20 | 40 | 60 | 30 |
| DQ2028L | 150 | 200 | 250 | 200 | 200 | 200 | 200 |
| Property | | | | | | | |
| Dk(10G) | 2.8 | 2.9 | 3.1 | 2.9 | 2.9 | 2.9 | 2.9 |
| Df(10G) | 0.00033 | 0.00034 | 0.00035 | 0.00034 | 0.00034 | 0.00034 | 0.00034 |
| Water absorption rate (%) | 0.25 | 0.25 | 0.24 | 0.24 | 0.26 | 0.28 | 0.25 |
| Dk(10G) 5-batch range of the substrates | 0.070 | 0.080 | 0.080 | 0.070 | 0.090 | 0.120 | 0.082 |
| Thickness (0.76 mm) 5-batch range of the substrates | 0.042 | 0.051 | 0.050 | 0.040 | 0.050 | 0.070 | 0.054 |

TABLE 7

| Component | Comparative Example 8 | Comparative Example 9 | Comparative Example 10 | Comparative Example 11 | Comparative Example 12 | Comparative Example 13 | Comparative Example 14 |
|---|---|---|---|---|---|---|---|
| SA9000 | 50 | 80 | 30 | 50 | 50 | 50 | 50 |
| Ricon100 | 50 | 20 | 70 | 50 | 50 | 50 | 50 |
| DCP | 3.0 | 2.0 | 2.0 | 2.0 | 2.0 | 3.0 | 3.0 |
| BT-93W | 20 | 20 | 20 | 15 | 20 | 25 | 0 |
| XP-7866 | 0 | 0 | 0 | 0 | 0 | 0 | 25 |
| iM16K | 30 | 30 | 30 | 20 | 40 | 60 | 30 |
| DQ2028L | 150 | 200 | 250 | 200 | 200 | 200 | 200 |
| Property | | | | | | | |
| Dk(10G) | 2.9 | 3.0 | 3.2 | 3.0 | 3.0 | 3.0 | 3.0 |
| Df(10G) | 0.00035 | 0.00036 | 0.00037 | 0.00036 | 0.00036 | 0.00036 | 0.00036 |
| Water absorption rate (%) | 0.24 | 0.26 | 0.25 | 0.25 | 0.26 | 0.28 | 0.27 |
| Dk(10G) 5-batch | 0.071 | 0.082 | 0.081 | 0.070 | 0.092 | 0.118 | 0.080 |

TABLE 7-continued

| Component | Comparative Example 8 | Comparative Example 9 | Comparative Example 10 | Comparative Example 11 | Comparative Example 12 | Comparative Example 13 | Comparative Example 14 |
|---|---|---|---|---|---|---|---|
| range of the substrates Thickness (0.76 mm) 5-batch range of the substrates | 0.043 | 0.052 | 0.050 | 0.042 | 0.051 | 0.074 | 0.055 |

The methods for testing the properties described above were as follows. (1) Test method of Dk/Df: an IPC-TM-650 2.5.5.5 standard method was used with a frequency of 10 GHz.

(2) Test method of water absorption rate: an IPC-TM-650 2.6.2.1 standard method was used.

(3) Particle size: Malvern laser particle size analyzer.

Furthermore, the 5-batch range of the substrates was obtained by subtracting the minimum value from the maximum value of Dk or the thickness in 5 batches of substrates produced in an Example or a Comparative Example.

Dk(10 G), Df(10 G), and the water absorption rate (%) in each of Tables 2-5 were average values of Dk(10 G), Df(10 G), and the water absorption rate (%) of 5 batches of substrates produced in an Example or a Comparative Example.

Analysis of Physical Properties:

As can be known from Examples 1-28, the hollow borosilicate microspheres with surfaces chemically modified by a vinyl polyphenylene ether resin was used in the substrate produced, and the overall properties including the inter-batch range of the dielectric constant of the substrate, the inter-batch range of the thickness of the substrate, and the water absorption rate were excellent and the requirements for overall properties by customers could be satisfied.

As can be known from the comparison between Comparative Examples 1-7 and Examples 1-7, with respect to a resin system in which the hollow borosilicate microspheres with surfaces chemically modified by a vinyl polyphenylene ether resin was not used, the inter-batch range of the dielectric constant of the substrate produced was large, the inter-batch range of the thickness of the substrate was large, and the water absorption rate was increased.

As can be known from the comparison between Comparative Examples 8-14 and Examples 8-14, with respect to a resin system in which the hollow borosilicate microspheres with surfaces chemically modified by a vinyl polyphenylene ether resin was not used, the inter-batch range of the dielectric constant of the substrate produced was large, the inter-batch range of the thickness of the substrate was large, and the water absorption rate was increased.

Obviously, various modifications and variations may be made to the Examples of this disclosure by those skilled in the art without deviating from the spirit and the scope of this disclosure. Thus, if these modifications and variations of this disclosure are within the scope of this disclosure according to the claims and equivalent techniques thereof, this disclosure also intends to encompass these modifications and variations.

What is claimed is:

1. A vinyl thermosetting resin composition, comprising the following components:
   (1) a vinyl thermosetting resin;
   (2) a curing agent; and
   (3) hollow borosilicate microspheres with surfaces chemically modified by a vinyl polyphenylene ether resin.

2. The vinyl thermosetting resin composition of claim 1, wherein the hollow borosilicate microspheres with surfaces chemically modified by a vinyl polyphenylene ether resin are not treated with an alkaline liquor.

3. The vinyl thermosetting resin composition of claim 1, wherein the hollow borosilicate microspheres with surfaces chemically modified by a vinyl polyphenylene ether resin are obtained by chemical modification of chemically untreated hollow borosilicate microspheres with a vinyl silane coupling agent and a thermosetting polyphenylene ether resin having an unsaturated double bond, wherein a content of the chemically untreated hollow borosilicate microspheres is 94% to 96% by weight with respect to the hollow borosilicate microspheres with surfaces chemically modified by a vinyl polyphenylene ether resin.

4. The vinyl thermosetting resin composition of claim 1, wherein the hollow borosilicate microspheres with surfaces chemically modified by a vinyl polyphenylene ether resin has an average particle diameter of no greater than 50 μm.

5. The vinyl thermosetting resin composition of claim 1, wherein the hollow borosilicate microspheres with surfaces chemically modified by a vinyl polyphenylene ether resin is 10 to 60 parts by weight with respect to 100 parts by weight of the vinyl thermosetting resin.

6. The vinyl thermosetting resin composition of claim 1, wherein the hollow borosilicate microspheres with surfaces chemically modified by a vinyl polyphenylene ether resin is 20 to 50 parts by weight with respect to 100 parts by weight of the vinyl thermosetting resin.

7. The vinyl thermosetting resin composition of claim 1, wherein the curing agent is 1 to 3 parts by weight with respect to 100 parts by weight of the vinyl thermosetting resin.

8. The vinyl thermosetting resin composition of claim 1, wherein the vinyl thermosetting resin is selected from one of a polyphenylene ether resin having an unsaturated double bond, a polybutadiene resin, a polybutadiene copolymer resin, and an elastomer block copolymer, or a mixture of at least two thereof.

9. The vinyl thermosetting resin composition of claim 8, wherein the polyphenylene ether resin having an unsaturated double bond is selected from one of a polyphenylene ether resin in which two terminal modifying groups are acryl groups, a polyphenylene ether resin in which two terminal modifying groups are styryl groups, and a polyphenylene ether resin in which two terminal modifying groups are vinyl groups, or a mixture of at least two thereof.

10. The vinyl thermosetting resin composition of claim 8, wherein the polybutadiene resin is selected from one of a 1,2-polybutadiene resin, a maleic anhydride modified polybutadiene resin, an acrylate modified polybutadiene resin, an epoxy modified polybutadiene resin, an amino modified polybutadiene resin, a terminal carboxyl modified polybutadiene resin, and a terminal hydroxy modified polybutadiene resin, or a mixture of at least two thereof.

11. The vinyl thermosetting resin composition of claim 8, wherein the polybutadiene copolymer resin is selected from one of a polybutadiene-styrene copolymer resin, a polybutadiene-styrene-divinylbenzene graft copolymer resin, a maleic anhydride modified styrene-butadiene copolymer resin, and an acrylate modified styrene-butadiene copolymer resin, or a mixture of at least two thereof.

12. The vinyl thermosetting resin composition of claim 8, wherein the elastomer block copolymer is selected from one of a styrene-butadiene diblock copolymer, a styrene-butadiene-styrene triblock copolymer, a styrene-(ethylene-butene)-styrene triblock copolymer, a styrene-isoprene diblock copolymer, a styrene-isoprene-styrene triblock copolymer, a styrene-(ethylene-propylene)-styrene triblock copolymer, and a styrene-(ethylene-butene) diblock copolymer, or a mixture of at least two thereof.

13. The vinyl thermosetting resin composition of claim 1, wherein the curing agent is selected from one of an organic peroxide radical curing agent and a carbon-based radical curing agent, or a mixture of at least two thereof.

14. The vinyl thermosetting resin composition of claim 13, wherein the organic peroxide radical curing agent is selected from one of dicumyl peroxide, 1,3-bis(tert-butylperoxyisopropyl)benzene, 2,5-di-tert-butylperoxy-2,5-dimethylhexane, 2,5-di-tert-butylperoxy-2,5-dimethyl-3-hexyne, di-t-butyl peroxide, and tert-butylcumyl peroxide, or a mixture of at least two thereof.

15. A prepreg, comprising a reinforcing material and the vinyl thermosetting resin composition according to claim 1 attached thereon after impregnation and drying.

16. A metal foil-clad laminate, comprising: a sheet of the prepreg according to claim 15 and a metal foil clad on one side or both sides of the prepreg; or at least two sheets of laminated prepregs and a metal foil clad on one side or both sides of the laminated prepregs, wherein at least one sheet of the at least two sheets of the laminated prepregs is the prepreg according to claim 15.

17. A printed circuit board, comprising at least one sheet of the prepreg according to claim 15.

* * * * *

UNITED STATES PATENT AND TRADEMARK OFFICE
CERTIFICATE OF CORRECTION

PATENT NO. : 11,053,352 B2  
APPLICATION NO. : 16/523735  
DATED : July 6, 2021  
INVENTOR(S) : Chen et al.

Page 1 of 1

It is certified that error appears in the above-identified patent and that said Letters Patent is hereby corrected as shown below:

On the Title Page

Column 2, Item (56), Line 6, under Other Publications, delete "009961 6" and insert --0099616--.

In the Specification

In Column 7, Line 37, delete "y-" and insert --γ--.

In Column 8, Line 23, delete "Adematacs." and insert --Admatechs--.

In Column 10, Line 11, delete "min" and insert --min.--.

In Column 10, Line 55, delete "min" and insert --min.--.

In Column 11, Line 5, delete "ware" and insert --were--.

In Column 11, Table 1, Line 44 (approx.), delete "Ademataes" and insert --Admatechs--.

In Column 12, Line 34, delete "10Z" and insert --1 OZ--.

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*